United States Patent
Qiu et al.

(10) Patent No.: US 12,482,252 B2
(45) Date of Patent: Nov. 25, 2025

(54) ADAPTIVELY CENTERED REPRESENTATION FOR ZERO-SHOT ANOMALY DETECTION METHODS

(71) Applicant: Robert Bosch GmbH, Stuttgart (DE)

(72) Inventors: Chen Qiu, Pittsburgh, PA (US); Maja Rudolph, Madison, WI (US); Aodong Li, Irvine, CA (US)

(73) Assignee: Robert Bosch GmbH, Stuttgart (DE)

( * ) Notice: Subject to any disclaimer, the term of this patent is extended or adjusted under 35 U.S.C. 154(b) by 476 days.

(21) Appl. No.: 18/170,253

(22) Filed: Feb. 16, 2023

(65) Prior Publication Data

US 2024/0290082 A1 Aug. 29, 2024

(51) Int. Cl.
*G06V 10/82* (2022.01)
*G06V 10/774* (2022.01)

(52) U.S. Cl.
CPC ............ *G06V 10/82* (2022.01); *G06V 10/774* (2022.01)

(58) Field of Classification Search
CPC .. G06V 10/82; G06V 10/774; G06F 18/2433; G06F 18/214; G06N 3/0985
USPC ....................................................... 382/156
See application file for complete search history.

(56) References Cited

FOREIGN PATENT DOCUMENTS

| CA | 3055597 A1 | * | 9/2018 | ........... G06V 10/774 |
| WO | WO-2024086537 A1 | * | 4/2024 | ............. G16H 40/67 |

OTHER PUBLICATIONS

Frikha, A. et al., "Few-Shot One-Class Classification via Meta-Learning," Jul. 2020, 22 pages, https://www.researchgate.net/publication/342801195_Few-Shot_One-Class_Classification_via_Meta-Learning.
Li, A. et al., "Zero-Shot Batch-Level Anomaly Detection," 2023, 26 pages, https://doi.org/10.48550/arXiv.2302.07849.
Ruff, L. et al., "Deep One-Class Classification," Proceedings of the 35th International Conference on Machine Learning, 2018, vol. 80, 10 pages, https://proceedings.mlr.press/v80/ruff18a.html.
Qiu, C. et al., "Latent Outlier Exposure for Anomaly Detection with Contaminated Data," Proceedings of the 39th International Conference on Machine Learning, 2022, 15 pages, https://doi.org/10.48550/arXiv.2202.08088.
Qiu, C. et al., "Neural Transformation Learning for Deep Anomaly Detection Beyond Images," Proceedings of the 38th International Conference on Machine Learning, 2021, 20 pages, https://doi.org/10.48550/arXiv.2103.16440.

* cited by examiner

*Primary Examiner* — Charlotte M Baker
(74) *Attorney, Agent, or Firm* — Brooks Kushman P.C.

(57) ABSTRACT

A simple and highly effective zero-shot anomaly detection approach is disclosed. The approach is compatible with a variety of established anomaly detection methods. The approach relies on training an anomaly detector, such as a neural network, on a meta-set in combination with batch normalization.

20 Claims, 5 Drawing Sheets

ADAPTIVELY CENTERED REPRESENTATION FOR ZERO-SHOT ANOMALY DETECTION METHODS

TECHNICAL FIELD

The present disclosure relates to anomaly detector ("AD") training methods. In some embodiments, a zero-shot anomaly detector is trained on a meta-set in combination with batch normalization.

BACKGROUND

Anomaly detection—the task of identifying data instances deviating from the norm—is significant in many application domains. These domains include fake review identification and bot detection in social networks, tumor recognition, and industrial fault detection. Anomaly detection has also found use in detecting anomalies in a chemical plant and self-driving cars.

The notion of an "anomaly" may inherently depend on an understood notion of "normal" data. However, the notion of normality depends on the context, and normality may drift over time. For example, when monitoring network traffic for intrusions, normal data may differ from user to user and day to day. Medical imaging data depends on the patient and the laboratory equipment employed.

Adapting an anomaly detector to drift in the normal data distribution may be a task performed in zero-shot AD. Current proposals for zero-shot AD have primarily dealt with foundation models-large neural networks trained on massive unlabeled data at scale by self-supervised learning.

Foundation models have shown promise in many areas, especially in vision and natural language processing ("NLP"). However, many AD applications involve data from specialized domains, such as data from industrial fault detection, network intrusion detection, bot detection, healthcare, medical imaging, and other applications, which may limit application of the AD applications. Besides text and images, AD commonly involves time series and tabular data for which no foundation models are currently available. Furthermore, foundation models have a large carbon footprint and lack accessibility to the broader public.

SUMMARY

The present disclosure provides a solution to one or more aspects of zero-shot AD problems, where an AD can adapt to drift in a normal data distribution. One or more embodiments do not require the implementation of foundation models for zero-shot AD. The present disclosure includes, in one or more embodiments, a new lightweight model for zero-shot AD, referred to herein as Adaptive Centered Representations ("ACRs"). ACR is theoretically grounded, simple, domain-independent, and easy to implement and use. It can be employed for zero-shot AD using data from any domain, whether it is time series or tabular data, DNA sequences, or graphs, for example.

In one or more embodiments, ACR relies on a simple idea, namely, training an anomaly detector on a meta-set of related distributions of training data using batch normalization layers. The present disclosure shows that ACR allows a model to automatically adapt to data from new but related distributions. That is, the model can do zero-shot learning. This approach may apply to a variety of backbone models commonly used in deep AD.

In some embodiments, a method for generating an anomaly detector is disclosed. The method comprises operations of: generating a plurality of training distributions, each training distribution representing a different task; for each of the plurality of training distributions, normalizing a batch from the training distribution; for each of the normalized batches, including in a neural network a normalization layer; generating a loss function, wherein the loss function, when applied to training data, includes a first loss for each data point in the training data that is an anomaly and includes a second loss for each data point in the training data that is not an anomaly (e.g., normal); and training the neural network, wherein the training includes applying the generated loss function to the training data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
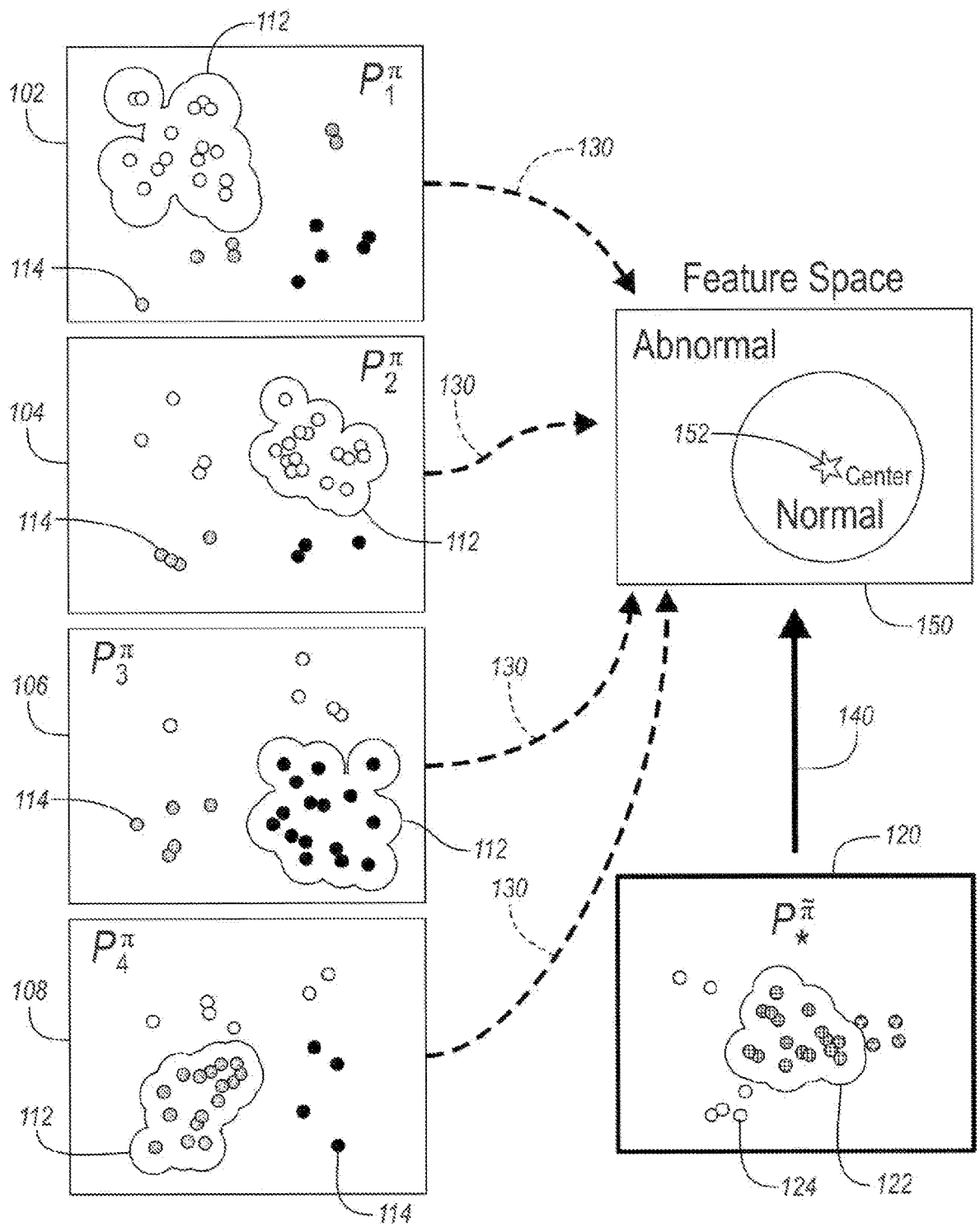
FIG. 1 illustrates examples of training and testing in one or more embodiments.

Referring to FIG. 1, an approach for using deep support vector data description ("DSVDD") is illustrated. DSVDD is trained to map high-dimensional data, such as images, to a single point (e.g., "the center") in a lower-dimensional feature space. At test time, DSVDD scores anomalies based on their $l_2$ distance to the center, i.e., distant points are considered anomalies.

FIG. 1 illustrates training and testing setups for DSVDD. FIG. 1 discloses four related datasets 102, 104, 106, and 108, for training 130, each one equipped with abnormal (scattered) 114 and normal samples (clustered and encircled) 112. A single DSVDD may be trained 130, using batch normalization, to map normal samples 112 into the vicinity of a center 152 in a feature space 150 and map abnormal samples 114 away from the center where applicable. For a new dataset 120, one or more embodiments instantaneously adapt to the new data distribution of the new dataset 120 and map all normal samples 122 to the same region in the feature space 150. During training, the model learns to solve all tasks jointly, (a) learning separable features for samples from different distributions and (b) learning to map the samples from the major (normal) distribution to a shared learned center in embedding space while mapping other samples away from the center. At test time 140, the learned model exploits the learned inductive bias to map the normal (majority) samples 122 to the center 152 of embedding space while mapping anomalous samples 124 away from the center 152.

During training, a model may learn to solve all tasks jointly, (a) learning separable features for samples from different distributions and (b) learning to map the samples from the major (normal) distribution to a shared learned center in embedding space while mapping other samples away from the center. At test time, the learned model exploits the learned inductive bias to map the normal (majority) samples to the center of embedding space while mapping anomalous samples away from the center.

Batch normalization is a mechanism to re-calibrate the distribution of intermediate features in a mini-batch based on the majority of data in the batch. Assuming that this majority will be representative of each data distribution's "normal" component, a single one-class AD model can be trained on multiple data distributions (with relative distribution shifts) simultaneously.

One or more embodiments disclose that training off-the-shelf deep anomaly detectors on a meta-training set, using batch normalization layers, gives automatic zero-shot generalization for AD. One or more embodiments disclose zero-shot AD results on tabular data and retain a high degree of accuracy. Additionally, one or more embodiments disclosed herein achieve state-of-the-art zero-shot AD results on non-natural images and competitive results on natural images.

A distribution of interrelated data distributions is a standard assumption in meta learning and zero-shot learning. Let Q be a (meta-)distribution from which we sample K training distributions $P_1, \ldots, P_K$ and a test distribution $P^*$. As indicated in Equation 1, the elements of the distributions $P_1, \ldots, P_K, P^*$ are independent and identically distributed from Q.

$$P_1, \ldots, P_K, P^* \overset{i.i.d.}{\sim} Q \qquad (1)$$

The distributions in Q are assumed to share some common structure, such that training a model on one distribution has the potential to aid in deploying the model on another distribution. For example, the data x could be radiology images from patients, and each $P_j$ or $P^*$ could be a distribution of images from a specific hospital. These distributions may share similarities but differ systematically because of differences in radiology equipment, calibration, and/or patient demographics.

The goal of one or more embodiments is to use data from only the distributions $P_1, \ldots, P_K$ to learn an anomaly detector, e.g., a model that learns to distinguish samples compatible with PP from samples not coming from $P_j$, as disclosed in more detail below. After training, the anomaly detector may adapt (in a zero-shot fashion) to the test distribution $P^*$ without further training. The anomaly detector may discover anomalies with respect to the "new normal" distribution $P^*$.

Adaptively Centered Representations

One or more embodiments include an anomaly score function, characterized by learnable parameters θ and a distribution $P \in \{P^*, P_1, \ldots, P_K\}$ such that $$S_\theta(x|P) \to \begin{cases} \text{small} & \text{if } x \sim P \\ \text{large} & \text{if } x \text{ not} \sim P \end{cases} \qquad (2)$$

At training, the parameters θ are learned to satisfy Equation (2) with $P=P_j$ on samples x from the training distributions $P_1, \ldots, P_K$. Since the training and test distribution(s) are drawn from the same meta distribution (Equation (1)), the test distribution $P=P^*$ should approximately satisfy Equation (2) too, if K is sufficiently large. In other words, $S_\theta(x|P^*)$ is a reasonable anomaly score at test time.

In any practical training or testing environment, a mixture of normal samples and anomalies may be encountered. To simulate the fact that each $P_j$ during training is not "pure", it is contaminated by admixing a fraction (1−π) of data points from a complementing distribution $\bar{P}_j$, representative of anomalies. Since $\bar{P}_j$ is unknown, it is approximated (e.g., heuristically) during training with a mixture over the other components in the training data. This results in the following corrupted version of $\bar{P}_j$:

$$P_j^\pi := \pi P_j + (1-\pi)\bar{P}_j, \quad \bar{P}_j := \frac{1}{K-1}\sum_{i \neq j} P_i \qquad (3)$$

In one or more embodiments, π is chosen such that $$\frac{1}{2} << \pi \le 1.$$

Analogously, a test mixture distribution $P_*^\pi$ may be defined. This general notation may capture the case where the training distribution is free of anomalies (i.e., where π=1). A loss function that exploits artificial anomalies from $\bar{P}_j$ during training is disclosed below.

Training Objective. In one or more embodiments, it is assumed that optimizing the anomaly score $S_\theta(x|P_j)$ can be achieved by minimizing a corresponding loss function $L_\theta(x|P_j)$. The loss function's parameters θ are shared across the different anomaly detection tasks j. In the simplest setup, this loss function is identical to the anomaly score, i.e., $L_\theta(x|P_j)=S_\theta(x|P_j)$, minimized over "normal" samples, but other more sophisticated setups may be considered. Accordingly, the following minimization problem may be considered:

$$\min_\theta \sum_{j=1}^K E_{x \sim P_j^\pi}[L_\theta(x|P_j)]. \qquad (4)$$

Typical choices for self-supervised training losses are DSVDD or neural transform learning ("NTL"). Additional details are disclosed below in connection with Meta-training for Zero-shot Anomaly Detection.

Adapting to New Data Distributions. The anomaly score or loss function can depend on a training or test distribution P. It is assumed that, after training, adjusting any parameters θ to newly encountered distributions is not allowed.

The anomaly scores may be evaluated, not individually for single data points, but jointly based on a mini-batch $$x_{1:B} \overset{i.i.d.}{\sim} P:$$

$$S_\theta(x|P) \sim S_\theta(x|x_{1:B}) \qquad (5)$$

$$L_\theta(x|P) \sim L_\theta(x|x_{1:B}),$$

where B is the number of data points in the mini-batch. Since distributions P typically encountered in AD practice dominantly consist of "normal" samples, information about P can be extracted from the mini-batch. The minimization problem then becomes $$\min_\theta \sum_{j=1}^K E_{(x_{1:B})^{i.i.d.} P_j^\pi} \left[ \sum_{i=1}^B L_\theta(x_i | x_{1:B}) \right], \quad (6)$$

where E in Equations 4 and 6 is the expectation.

In a simple outlier detector free of parameters θ:

$$S_\theta(x | x_{1:B}) = \left\| x - \frac{1}{B} \sum_{j=1}^B x_j \right\|_2^2. \quad (7)$$

If the $x_i$ lie in an informative feature space, anomalies will have a higher-than-usual distance to the mean, making the approach a simple, adaptive AD method.

While this example provides a proof of concept, in practice, the normal samples typically do not concentrate around their mean in the raw data space. Some embodiments are based on an approach that learns to encode the samples (of potentially unseen test distributions) into a feature space where the intuition behind this example can be exploited for zero-shot AD.

Figure 2:
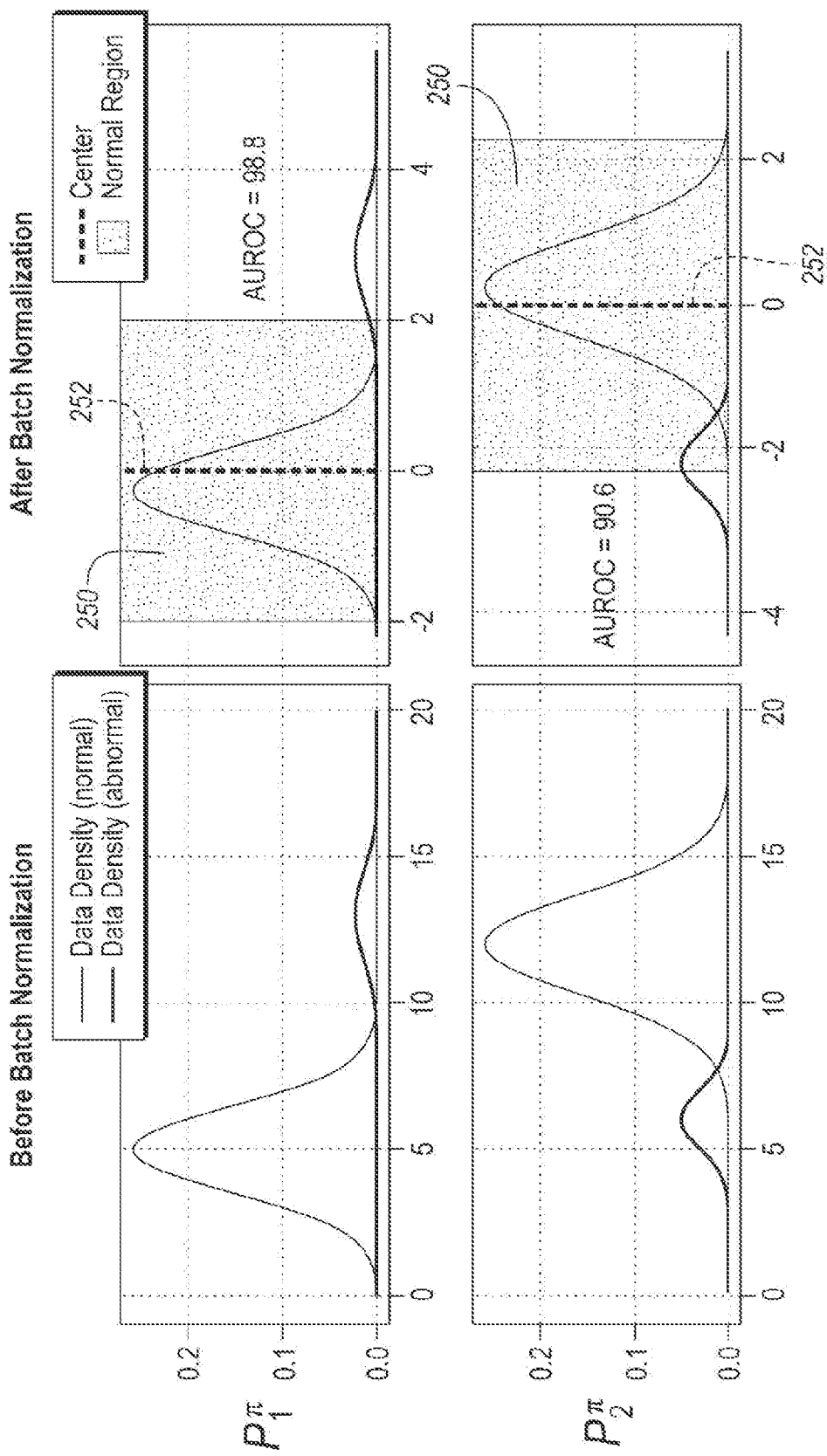
FIG. 2 illustrates an example of batch normalization in one or more embodiments.

Zero-shot Adaptation by Batch Normalization. Some embodiments use, as an anomaly score, a neural network $S_\theta(x|P)=f_\theta(x)$ with batch normalization layers and $f_\theta$ obtained by meta-training of Equation (6). Referring to FIGS. 2, some embodiments batch-normalize the normal data in each task (separately) so that each task is approximately centered around the origin (zero) and has variance one in neural feature space. In that way, the neural network adapts to the majority of data in a batch (e.g., "new normal") to accomplish its training task.

FIG. 2 illustrates batch normalization for AD with two tasks $P_1^\pi$ and $P_2^\pi$. One or more embodiments (batch-) normalize the data in $P_j^\pi$ separately. If each $P_j^\pi$ consists mainly of normal samples, most samples may be shifted close to the origin (i.e., center 252) by subtracting the respective task's mean. As a result, the samples from all tasks concentrate around the origin in a joint feature space 250 and thus can be tightly enclosed using, e.g., one-class classification. Samples from the test task are batch normalized in the same way.

In some embodiments, batch statistics $\{(\mu_l, \sigma_l)\}_{l=1}^L$ in all L layers of the neural network are adaptive with $\{x_i\}_{i=1}^B$. For every batch normalization layer l with inputs $\{f_{\theta,l}(x_i)\}_{i=1}^B$:

$$\mu_l = \sum_{i=1}^B f_{\theta,l}(x_i)/B, \quad \sigma_l = \left( \sum_{i=1}^B (f_{\theta,l}(x_i) - \mu_l)^2/B \right)^{1/2}.$$

Figure 3:
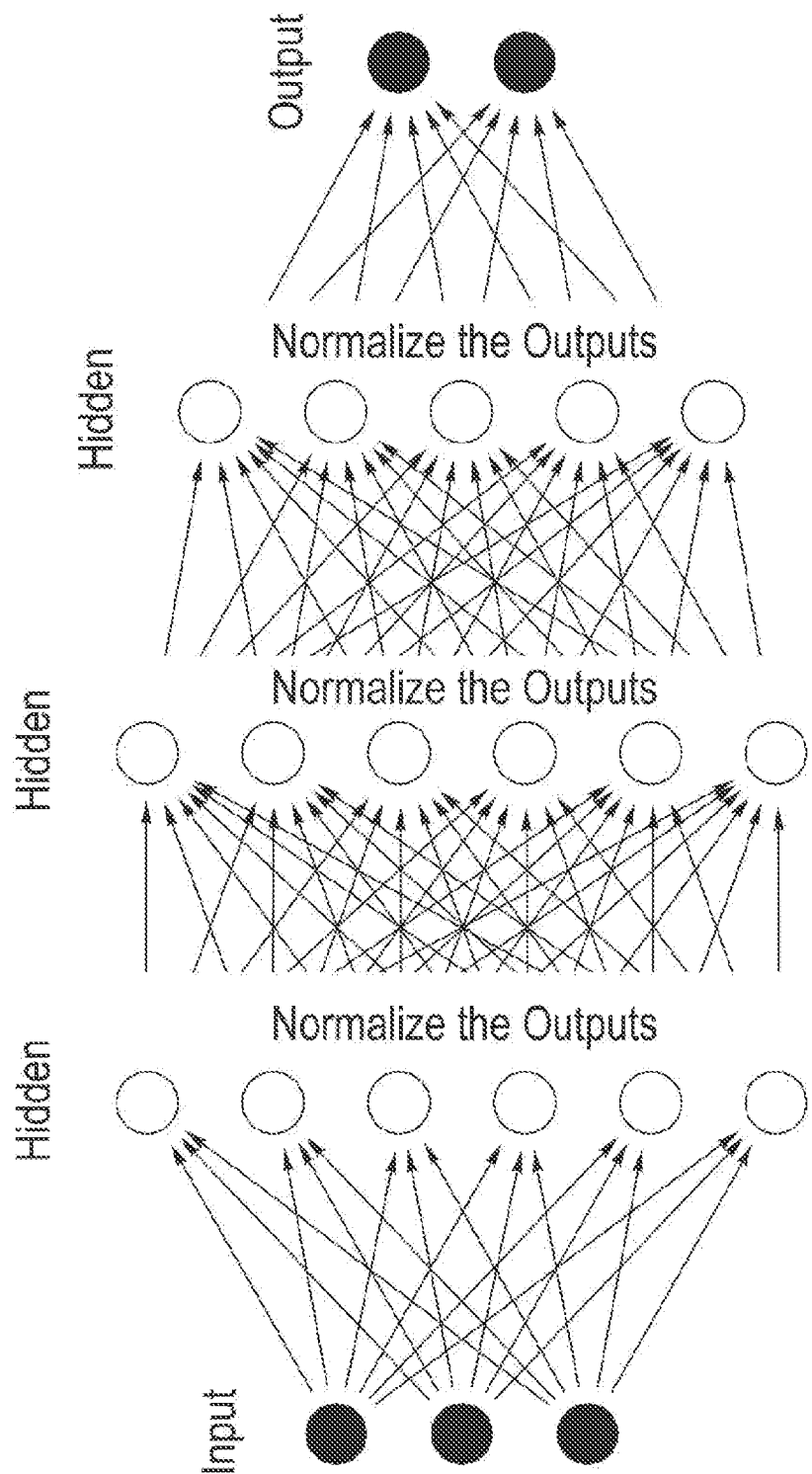
FIG. 3 illustrates an example of a neural network in accordance one or more embodiments.

All computations are point-wise. To preserve the adaptability of the batch normalization layers, all batch statistics $\{(\mu_l, \sigma_l)\}_{l=1}^L$ are computed on the fly from the training/test samples. Since normal samples make up the majority of the batch, computing $\mu_l$ is dominated by normal samples. FIG. 3 discloses an example neural network where the number of normalization layers L is 3. In some embodiments, each normalized layer applies to different hierarchical features of the neural network.

As a result, regardless of the task, the distance to the origin defines a reasonable anomaly score. Remarkably, in one or more embodiments, an anomaly detector is obtained generalizing to unseen distributions without the need to adjust any model parameters.

Meta-Training for Zero-Shot Anomaly Detection

One or more embodiments may include learning a zero-shot anomaly detection model. In some embodiments, improved performance is obtained when using labeled anomalies from $\bar{P}_j$ during training.

Many anomaly scores $S_\theta(x|P)$ may allow for easily constructing a score $A_\theta(x|P)$ with opposite behavior. For example, if $S_\theta(x)=\|f_\theta(x)-c\|^2$ (thus pulling normal data points towards their center), we define $A_\theta(x)=1/\|f_\theta(x)-c\|^2$ (pushing abnormal data away from the center).

Consider a task-sample indicator variable $y_{i,j}$ as $$y_{i,j} = \begin{cases} 1 & \text{if } x_i \in P_j \\ 0 & \text{if } x_i \in \bar{P}_j \end{cases}, \quad (8)$$

which is also called an anomaly label. A choice for the loss function in Equation (6) is therefore $$L_\theta(x_i | x_{1:B}) = (1 - y_{i,j}) S_\theta(x_i | x_{1:B}) + y_{i,j} A_\theta(x_i | x_{1:B}).$$

The loss function resembles the outlier exposure loss disclosed in *Deep anomaly detection with outlier exposure*; Hendrycks, D; Mazeika, M.; and Dietterich, T.; International Conference on Learning Representations, 2018. But as opposed to using synthetically generated samples (typically only available for images), samples are used from the complement $\bar{P}_j$ at training time to synthesize outliers.

In addition to DSVDD, one or more embodiments use backbone models such as binary classifiers and NTL. For binary classifiers, $S_\theta(x)$ may be set to $-\log(1-\sigma(f_\theta(x)))$ and $A_\theta(x)$ may be set to $-\log \sigma(f_\theta(x))$. For NTL, embodiments may use $S_\theta$ and $A_\theta$ as disclosed in *Latent outlier exposure for anomaly detection with contaminated data*; Qiu, C.; Li, A.; Kloft, M.; Rudolph, M.; and Mandt, S. Proceedings of the 39th International Conference on Machine Learning, volume 162 of Proceedings of Machine Learning Research, pp. 18153-18167. PMLR, 17-23 Jul. 2022b (URL https://proceedings.mlr.press/v162/giu22b.html).

In one or more embodiments, by training to solve all tasks jointly, a model may learn to (a) extract features separating samples from different training distributions and (b) exploit the batch normalization layers to adapt the features for detecting normal and abnormal samples. Memorizing all training samples does not solve all training tasks jointly, since the indicator variables $y_{i,j}$ flip in different tasks: samples from different training distributions take majority. Instead, in one or more embodiments, a model learns how to utilize the batch normalization layers (as θ shared across tasks) to adapt to the majority samples, irrespective of which distribution these samples come from.

Experiments

Disclosed embodiments based on ACR were evaluated on both image and tabular data when distribution shifts occur at test time. These embodiments were compared with established baselines from the deep AD as well as zero-shot and few-shot AD literature. The experiments show that methods using ACR are suitable for different data types, applicable to diverse AD models, robust to various anomaly ratios, and significantly outperform existing baselines.

Results on image and tabular data are reported below. Ablation studies demonstrate that (a) meta outlier exposure is superior to one-class classification or AdaptFeat+BN and (b) batch normalization is essential for solving all training tasks jointly.

Practical Training and Testing. Training and testing distributions using labeled datasets were constructed. The labeled datasets are either classification datasets which have labels, or datasets where one of the covariates is binned to provide classes. All features x corresponding to one class label corresponds to one distribution $P_j$ (e.g., all zeros (0) in MNIST). The meta-dataset is a set of all these distributions (e.g., MNIST as a whole). The class labels are never used for learning tasks.

For training and testing, the meta-dataset is split into disjoint subsets. In the MNIST example, $P_0, \ldots, P_4$ are defined as the distributions of images with digits 0 to 4 and use them for training. For testing, a single distribution of digits not seen during training (e.g., digit 5) was selected as the "new normal" distribution $P^*$ to which the model is adapted. The remaining digits (6-9 in this example) are used as test-time anomalies. To reduce variance, the roles are rotated among digits 5-9, using each digit as a test distribution once.

Experiments on Images.

ACR was evaluated on images when applied to two simple backbone models: DSVDD and binary classifier. The evaluation demonstrates that one or more of the disclosed methods achieves superior zero-shot AD results on natural images, hand-written characters, and medical images.

Image Datasets. Four image datasets were employed. CIFAR100/CIFAR100-C, Omniglot, MNIST, and OrganA. For re-purposing the classification datasets to AD benchmarks, the "one-vs-rest" setting is used, the de-facto standard in AD benchmarking. The evaluation was iterated over all classes in the test set. CIFAR100 contains 100 classes of natural images, while the other datasets contain non-natural images. CIFAR100-C is the noise-corrupt version of CIFAR100's test data, thus deemed as distributionally shifted data. All training images were trained from CIFAR100 and all models were tested on CIFAR100-C. Omniglot is a benchmark dataset for meta-learning. It has 1623 classes of hand-written characters, where each class comprises 20 images. All models were trained on the first 1200 classes and tested on the unseen 423 classes. MNIST has ten classes of hand-written digits. OrganA is a medical image dataset with 11 classes (for various body organs). On both MNIST and OrganA, two successive classes were left out for testing and use the other classes for training. The evaluation is repeated on all combinations of two consecutive classes.

An embodiment of the disclosed anomaly detector was compared with an existing deep anomaly detector, an existing zero-shot AD baseline, and a few-shot AD baseline.

Anomaly detection with an inductive bias (ADIB) is a deep anomaly detector fine-tuning a pre-trained ResNet with outlier exposure. It achieves an Area Under the Curve ("AUC") of 99% on CIFAR-10, the highest reported number in the literature. CLIP-AD is a zero-shot method based on the foundation model CLIP. CLIP-AD detects anomalies by comparing a test image to a normal object's text description in a semantic space. Notice that running CLIP-AD requires a language description of the normal class, which can be a severe limitation in practice. One-class model-agnostic meta learning (OC-MAML) is a few-shot AD method trained with MAML. At test time, OC-MAML requires a few normal samples to update the model parameters. OC-MAML may be implemented using their officially release code with the same model architecture as our model. 1-shot OC-MAML is compared in all of the experiments. Feat+BN is an ablation of one or more ACR methods disclosed herein, where image features are extracted from a pre-trained ResNet and then batch normalization is applied on the output to score anomalies based on the distance to the center.

The original training set may be split into several training distributions $P_1, \ldots, P_K$ using its available class labels. The mixture training distributions may be constructed with $\pi=0.8$ (see Equation (3)). A single zero-shot AD model may be trained and tested in batches of different anomaly ratios. As part of the testing, two backbone models are implemented: DSVDD (ACR-DSVDD) and a binary classifier (ACR-BCE).

TABLE 1

AUC (%) with standard deviation for anomaly detection on CIFAR100-C with Gaussian noise or Gaussian Blur (Hendrycks & Dietterich, 2019). ACR with both backbone models perform best on images with Gaussian noise and outperform baselines except for CLIP-AD on images with Gaussian Blur.

| | Gaussian Noise | | | | Gaussian Blur | | | |
|---|---|---|---|---|---|---|---|---|
| | 1% | 5% | 10% | 20% | 1% | 5% | 10% | 20% |
| ADIB | 50.9 ± 2.4 | 50.5 ± 0.9 | 50.6 ± 0.9 | 50.2 ± 0.5 | 50.1 ± 1.4 | 51.1 ± 1.4 | 49.9 ± 1.0 | 49.8 ± 0.3 |
| Feat + BN | 62.5 ± 3.1 | 61.8 ± 1.7 | 61.2 ± 0.6 | 60.2 ± 0.4 | 64.9 ± 1.5 | 65.3 ± 1.2 | 64.0 ± 0.9 | 62.7 ± 0.4 |
| OC-MAML | 53.0 ± 3.6 | 54.1 ± 1.9 | 55.8 ± 0.6 | 57.1 ± 1.0 | 55.6 ± 3.6 | 56.6 ± 0.6 | 56.8 ± 1.1 | 57.6 ± 0.6 |
| CLIP-AD | 82.3 ± 1.1 | 82.6 ± 0.9 | 82.3 ± 0.9 | 82.6 ± 0.1 | 91.9 ± 0.8 | 92.7 ± 0.5 | 92.1 ± 0.5 | 92.3 ± 0.2 |
| ACR-DSVDD | 87.7 ± 1.4 | 86.3 ± 0.9 | 85.9 ± 0.4 | 85.6 ± 0.4 | 88.5 ± 1.1 | 88.5 ± 0.7 | 88.7 ± 0.4 | 88.6 ± 0.3 |
| ACR-BCE | 84.3 ± 2.2 | 86.0 ± 0.3 | 86.0 ± 0.2 | 85.7 ± 0.4 | 85.6 ± 1.3 | 85.0 ± 0.6 | 85.0 ± 0.9 | 84.7 ± 0.5 |

TABLE 2

AUC (%) with standard deviation for anomaly detection on non-natural images: Omniglot, MNIST, and OrganA. ACR with both backbone models outperforms all baselines on all datasets. In comparison, CLIP-AD performs much worse on non-natural images.

| | MNIST | | | OrganA | | | Omniglot | | |
|---|---|---|---|---|---|---|---|---|---|
| | 19% | 5% | 10% | 1% | 5% | 10% | 5% | 10% | 20% |
| ADIB | 50.4 ± 2.0 | 49.4 ± 1.7 | 49.4 ± 2.0 | 49.9 ± 6.3 | 50.3 ± 2.4 | 50.2 ± 1.3 | 50.8 ± 1.7 | 49.5 ± 0.6 | 49.7 ± 0.4 |
| Feat + BN | 80.0 ± 1.9 | 78.4 ± 1.5 | 74.9 ± 0.3 | 54.2 ± 1.7 | 53.5 ± 0.8 | 52.9 ± 0.3 | 88.1 ± 0.8 | 86.7 ± 0.5 | 84.4 ± 0.6 |

TABLE 2-continued

AUC (%) with standard deviation for anomaly detection on non-natural images: Omniglot, MNIST, and OrganA. ACR with both backbone models outperforms all baselines on all datasets. In comparison, CLIP-AD performs much worse on non-natural images.

|  | MNIST | | | OrganA | | | Omniglot | | |
| --- | --- | --- | --- | --- | --- | --- | --- | --- | --- |
|  | 1% | 5% | 10% | 1% | 5% | 10% | 5% | 10% | 20% |
| OC-MAML | 83.7 ± 3.5 | 86.0 ± 2.3 | 86.4 ± 2.8 | 73.7 ± 4.7 | 72.2 ± 2.6 | 74.2 ± 2.4 | 98.6 ± 0.3 | 98.4 ± 0.2 | 98.5 ± 0.1 |
| CLIP-AD | 53.9 ± 1.4 | 53.7 ± 0.9 | 53.9 ± 0.8 | 52.6 ± 0.8 | 51.9 ± 0.6 | 51.5 ± 0.2 | N/A | N/A | N/A |
| ACR-DSVDD | 91.9 ± 0.8 | 90.4 ± 0.2 | 88.8 ± 0.2 | 79.0 ± 1.0 | 77.7 ± 0.4 | 76.3 ± 0.3 | 99.1 ± 0.2 | 99.1 ± 0.2 | 99.2 ± 0.0 |
| ACR-BCE | 88.7 ± 0.6 | 87.8 ± 0.4 | 86.5 ± 0.3 | 81.1 ± 0.8 | 79.5 ± 0.4 | 78.3 ± 0.3 | 98.5 ± 0.2 | 98.9 ± 0.1 | 99.1 ± 0.1 |

The results in terms of the AUROC averaged over five independent test runs with standard deviation are reported herein. The model is applied to tasks with different anomaly ratios to study the robustness of ACR against the anomaly ratio at test time. The results on CIFAR100-C in Table 1 indicate that ACR significantly outperforms ADIB, Feat+ BN, and OC-MAML. ACR achieves results competitive with CLIP-AD under various anomaly ratios. Although ADIB achieves remarkable results on image AD when no distribution shift occurs, ADIB is not able to generalize its performance to the test data with distribution shifts. While the few-shot method OC-MAML relies on a sufficiently large set of normal data for the adaptation, ACR requires no normal data at test time and achieves better results without any parameter updates. CLIP-AD has strong performance on CIFAR100C, presumably because it is trained on massive natural images from the internet (also covering CIFAR100/CIFAR100-C related images) rather than its adaptation ability. Also, CLIP-AD requires a text description of the normal class and therefore receives more annotation information at test time than ACR. Still, ACR outperforms CLIP-AD when the test images are corrupted with Gaussian noise.

The performance on non-natural images was also evaluated and the results are reported in Table 2. The ACR consistently achieves the best results and significantly outperforms CLIP-AD. Since non-natural images are not included in the training set of CLIP, CLIP-AD does not perform well even on the simple MNIST dataset. Also, CLIP-AD cannot be applied on Omniglot since there is no available text description of the characters.

Figure 4:
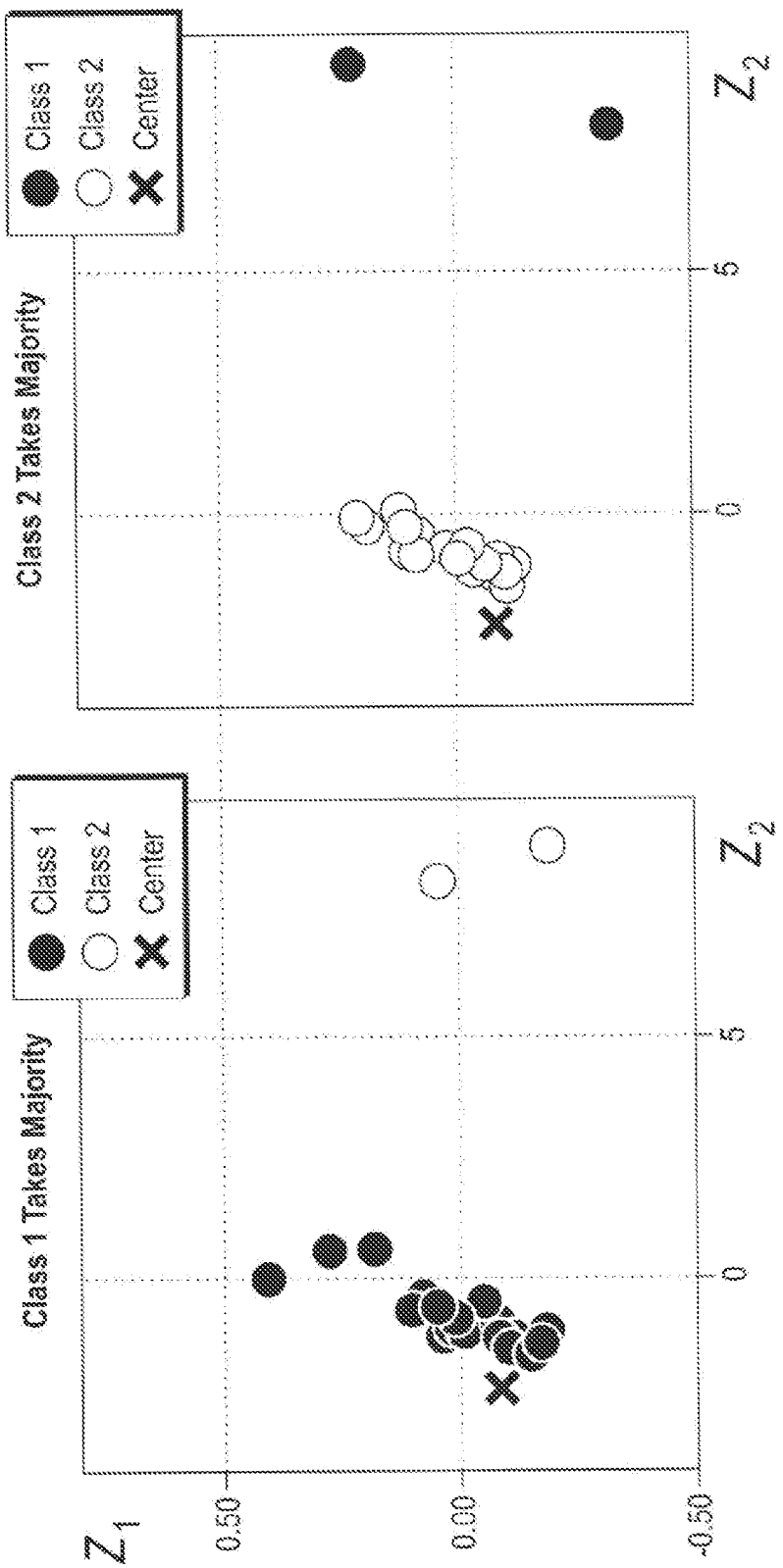
FIG. 4 illustrates a visualization of learned representations in accordance with one or more embodiments.

A visualization of the learned representations from DSVDD on the Omniglot dataset as qualitative evidence is provided in FIG. 4. FIG. 4 illustrates that even though the normal and abnormal data classes flip in two plots, the model learns to always center the samples from the majority class and map the samples from the minority class away from the center in the embedding space. In one or more embodiments, ACR is an easy-to-use zero-shot AD method and achieves superior zero-shot AD results on different types of images. The performance of ACR is also robust against the test anomaly ratios.

Experiments on Tabular Data

Tabular data is widely used in many real-world AD applications, e.g., network intrusion detection and malware detection. Distribution shifts occur naturally over time, especially in a large time span. ACR is evaluated on tabular AD when applied to DSVDD and NTL. The evaluation shows that ACR achieves on tabular data when distribution shifts occur.

Tabular datasets. Numerous methods were evaluated on two real-world tabular AD datasets: Anoshift and Malware. Anoshift is a traffic dataset for network intrusion detection collected over ten years (2006-2015). The preprocessing procedure and train/test split suggested in *A distribution shift benchmark for un-supervised anomaly detection*; Dragoi, M.; Burceanu, E.; Haller, E.; Manolache, A.; and Brad, F.; *Thirty-sixth Conference on Neural Information Processing Systems Datasets and Benchmarks Track*, 2022 ("Dragio et al.") is followed. The model is trained on normal data collected from 2006 to 2010, validated on a mixture of normal and abnormal samples collected from 2006 to 2010, and tested on a mixture of normal and abnormal samples (with anomaly ratios varying from 1% to 20%) collected from 2011 to 2015. Dragoi et al. observed that data distribution shifts gradually in 2014 and 2015.

Malware is a dataset of malicious and benign computer programs, collected from November of 2010 to July of 2014. Malware updates in an adversarial way, leading to shifts in both normal and abnormal data. We follow the preprocessing of Huynh, N. A., Ng, W. K., and Ariyapala, K.; A new adaptive learning algorithm and its application to online malware detection. In *International Conference on Discovery Science*, pp. 18-32; Springer; 2017; and convert the real-valued probabilities p of being malware to binary labels (labeled one if p>0.6 and zero if p<0.4). The samples with probabilities between 0.4 and 0.6 are discarded. The model is trained on normal samples collected from January of 2011 to December of 2013, validated on normal and abnormal samples from November of 2010 to December of 2010, and tested on normal and abnormal samples from January of 2014 to July of 2014 (with anomaly ratios varying from 1% to 20%).

Tabular Baselines. Comparisons were made with state-of-the art deep and shallow detectors for tabular AD. Their performance was analyzed under test distribution shifts. The shallow AD baselines include OC-SVM, IForest, LOF, and KNN. The deep AD baselines include DSVDD, Autoencoder (AE), LUNAR, internal contrastive learning (ICL), NTL, and BERT). The implementations from PyOD or their official repositories were adopted.

Implementation Details. The training set was split into training distributions based on the collection year in Anoshift and the month in Malware and set $\pi=0.8$. In each training task, a random attributes permutation was applied to all samples. Using attribute permutations as a task augmentation increases the variability of training tasks and encourages the model to learn permutation-invariant features. In testing tasks, the attributes are not permuted.

ACR-NTL has the same model architecture as the baseline NTL, and ACR-DSVDD adds one additional batch normalization layer on the top of the baseline DSVDD. For ACR-DSVDD, ACR is applied to the backbone model DSVDD). The neural network of DSVDD is a four-layer MLP with intermediate batch normalization layers and ReLU activations. The hidden sizes on Anoshift dataset are [128, 128, 128, 32]. The hidden sizes on Malware dataset are [64, 64, 64, 32]. One batch normalization layer is added on the top of the network on the Anoshift experiment. The statistics of all batch normalization layers are computed on the fly on the training/test batches. Adam was used with a learning rate of 4e-4 on the Anoshift dataset and 1e-4 on the Malware dataset. Our algorithm is applicable to the existing backbone models without complex modifications.

Results. In Table 3, the results on Anoshift are reported. The FAR split (data from 2014 and 2015) has significant distribution shifts compared to the training data (collected from 2006 to 2010) due to a large time gap. The AVG results reveal the averaged model performance on the test data from 2011 to 2015. For evaluating ACR's robustness to variations in the anomaly ratio, the results on test data have ratios varying from 1% to 20%. The AUC averaged over five independent test runs with standard deviation was reported. The results show that ACR outperforms all baselines on both FAR and AVG under all anomaly ratios. Remarkably, in one or more embodiments, ACR is the only method that performs better than random guess clearly on the FAR split. All baselines perform worse than random on the FAR split even though they achieve great results when no distribution shifts are present. Due to the strong distribution shift in the FAR split, the anomalies become hard to separate from the normal training samples and are even more similar to the normal training than the normal test samples. The superior performance of ACR may stem from its exceptional adaptation ability. ACR learns to adapt the learned representations and moves the samples sharing the majority patterns (which are considered normal) to the "center" in the feature space rather than memorizing the training data. Although it can be seen that ACR achieves the best results on all anomaly ratios, the performance of ACR degrades when the ratio increases. ACR-NTL is more robust against the high anomaly ratio compared to ACR-DSVDD. As the anomaly ratio increases, it becomes harder to detect the majority. However, a very high anomaly ratio in typical real-world AD applications is not typically faced.

The results on Malware are reported in Table 4. ACR-NTL achieves the best results under all anomaly ratios. All baselines except ICL perform worse than random guess, meaning that the malware successfully fools most of the baselines.

TABLE 4

AUC (%) with standard deviation for anomaly detection on Malware (Huynh et al., 2017). ACR-NTL achieves the best results on various anomaly ratios.

| | 1% | 5% | 10% | 20% |
|---|---|---|---|---|
| OC-SVM | 19.5 ± 5.6 | 20.5 ± 1.4 | 20.3 ± 0.9 | 20.3 ± 0.8 |
| IForest | 22.8 ± 2.9 | 22.9 ± 1.2 | 23.3 ± 0.6 | 23.4 ± 0.8 |
| LOF | 22.3 ± 4.9 | 23.2 ± 1.8 | 23.3 ± 1.3 | 23.2 ± 0.4 |
| KNN | 21.6 ± 6.3 | 22.5 ± 1.6 | 22.7 ± 0.9 | 22.6 ± 0.9 |
| DSVDD | 25.4 ± 3.3 | 27.4 ± 1.7 | 28.9 ± 0.9 | 28.3 ± 0.8 |
| AE | 48.8 ± 2.4 | 49.1 ± 1.2 | 49.4 ± 0.6 | 49.3 ± 0.5 |
| LUNAR | 23.1 ± 4.5 | 23.8 ± 1.2 | 24.1 ± 0.7 | 24.2 ± 0.6 |
| ICL | 83.5 ± 1.9 | 81.0 ± 1.0 | 82.9 ± 0.8 | 83.1 ± 0.9 |
| NTL | 25.9 ± 4.8 | 25.4 ± 1.3 | 24.5 ± 1.3 | 25.0 ± 0.8 |
| ACR-DSVDD | 73.1 ± 2.8 | 69.5 ± 3.3 | 69.4 ± 3.3 | 66.4 ± 4.0 |
| ACR-NTL | 85.0 ± 1.3 | 84.5 ± 0.8 | 85.1 ± 1.2 | 84.0 ± 0.8 |

Figure 5:
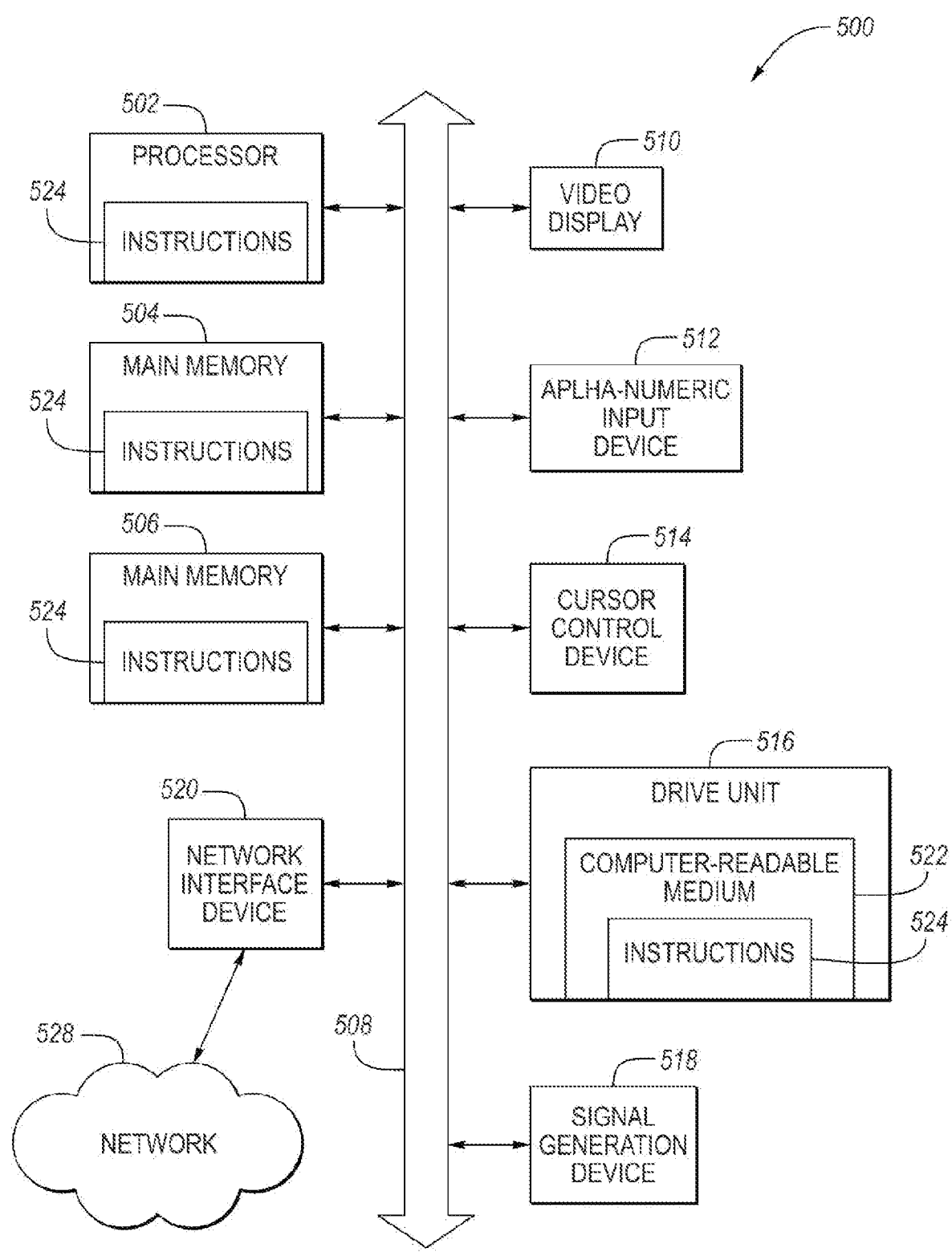
FIG. 5 illustrates an example computing system for performing one or more embodiments of methods disclosed herein.

FIG. 5 shows a block diagram of an example embodiment of a general computer system 500. The computer system 500 can include a set of instructions that can be executed to cause the computer system 500 to perform any one or more of the methods or computer-based functions disclosed herein. The computer system 500 may be connected to other computer systems or peripheral devices via a network. Additionally, the computer system 500 may include or be included within other computing devices.

As illustrated in FIG. 5, the computer system 500 may include one or more processors 502. The one or more processors 502 may include, for example, one or more central processing units (CPUs), one or more graphics processing units (GPUs), or both. The computer system 500 may include a main memory 504 and a static memory 506 that can communicate with each other via a bus 508. As shown, the computer system 500 may further include a video display unit 510, such as a liquid crystal display (LCD), a projection television display, a flat panel display, a plasma display, or a solid-state display. Additionally, the computer system 500 may include an input device 512, such as a remote-control device having a wireless keypad, a keyboard, a microphone coupled to a speech recognition engine, a camera such as a video camera or still camera, or a cursor control device 514, such as a mouse device. The computer system 500 may also include a disk drive unit 516, a signal generation device 518, such as a speaker, and a network

TABLE 3

AUC (%) with standard deviation for anomaly detection on Anoshift (Dragot et al., 2022). ACR with both backbone models outperforms all baselines on average over time spans other than the training set. Especially, ACR is the single method performs clearly better than random guess on FAR split where distribution shift occurs.

| | 1% | | 5% | | 10% | | 20% | |
|---|---|---|---|---|---|---|---|---|
| | FAR | AVG | FAR | AVG | FAR | AVG | FAR | AVG |
| OC-SVM | 49.6 ± 0.2 | 62.6 ± 0.1 | 49.6 ± 0.2 | 62.6 ± 0.1 | 49.5 ± 0.1 | 62.7 ± 0.1 | 49.5 ± 0.1 | 62.6 ± 0.1 |
| IForest | 25.8 ± 0.4 | 54.6 ± 0.2 | 26.1 ± 0.1 | 54.7 ± 0.1 | 26.0 ± 0.1 | 54.6 ± 0.1 | 26.0 ± 0.1 | 54.7 ± 0.1 |
| LOF | 37.3 ± 0.5 | 59.6 ± 0.3 | 37.0 ± 0.1 | 59.5 ± 0.1 | 37.0 ± 0.1 | 59.5 ± 0.1 | 37.1 ± 0.1 | 59.5 ± 0.1 |
| KNN | 45.0 ± 0.3 | 70.8 ± 0.1 | 45.3 ± 0.2 | 70.9 ± 0.1 | 45.1 ± 0.1 | 70.8 ± 0.1 | 45.2 ± 0.1 | 70.8 ± 0.1 |
| DSVDD | 34.6 ± 0.3 | 62.3 ± 0.2 | 34.7 ± 0.1 | 62.5 ± 0.1 | 34.7 ± 0.2 | 62.5 ± 0.1 | 34.7 ± 0.1 | 62.5 ± 0.1 |
| AE | 18.6 ± 0.2 | 25.3 ± 0.1 | 18.7 ± 0.2 | 25.5 ± 0.1 | 18.7 ± 0.1 | 25.5 ± 0.1 | 18.7 ± 0.1 | 25.5 ± 0.1 |
| LUNAR | 24.5 ± 0.4 | 38.3 ± 0.4 | 24.6 ± 0.1 | 38.6 ± 0.2 | 24.7 ± 0.1 | 38.7 ± 0.1 | 24.6 ± 0.1 | 38.6 ± 0.1 |
| ICL | 20.6 ± 0.3 | 50.5 ± 0.2 | 20.7 ± 0.2 | 50.4 ± 0.1 | 20.7 ± 0.1 | 50.4 ± 0.1 | 20.8 ± 0.1 | 50.4 ± 0.1 |
| NTL | 40.7 ± 0.3 | 57.0 ± 0.1 | 40.9 ± 0.2 | 57.1 ± 0.1 | 41.0 ± 0.1 | 57.1 ± 0.1 | 41.0 ± 0.1 | 57.1 ± 0.1 |
| BERT | 28.6 ± 0.3 | 64.6 ± 0.2 | 28.7 ± 0.1 | 64.6 ± 0.1 | 28.7 ± 0.1 | 64.6 ± 0.1 | 28.7 ± 0.1 | 64.7 ± 0.1 |
| ACR-DSVDD | 62.0 ± 0.5 | 74.0 ± 0.2 | 61.3 ± 0.1 | 73.3 ± 0.1 | 60.4 ± 0.1 | 72.5 ± 0.1 | 59.1 ± 0.1 | 73.2 ± 0.1 |
| ACR-NTL | 62.5 ± 0.2 | 73.4 ± 0.1 | 62.2 ± 0.1 | 73.2 ± 0.1 | 62.3 ± 0.1 | 73.1 ± 0.1 | 62.0 ± 0.1 | 72.7 ± 0.1 | interface device 520. The network interface 520 may enable the computer system 500 to communicate with other systems via a network 528.

In some embodiments, as depicted in FIG. 5, the disk drive unit 516 may include one or more computer-readable media 522 in which one or more sets of instructions 524, e.g., software, may be embedded. For example, the instructions 524 may embody one or more of the methods or functionalities, such as the methods or functionalities disclosed herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In some embodiments, dedicated hardware implementations, such as application specific integrated circuits, programmable logic arrays and other hardware devices, can be constructed to implement one or more of the methods or functionalities described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the system 500 may encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or functionalities disclosed herein.

In some embodiments, some or all of the computer-readable media will be non-transitory media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

CONCLUSION

The problem of adapting an anomaly detector to a new data distribution, where the concept of "normality" changed, was addressed. Some disclosed embodiments are a zero-shot approach in the sense that no further training is required. A new meta-training approach was disclosed, where an off-the-shelf deep anomaly detection method was trained on a (meta) set of interrelated datasets, adopting batch normalization in every layer. Disclosed experiments on image and tabular data show strong results and in particular demonstrate state-of-the-art zero-shot adaptation when no foundation model was available.

Embodiments disclosed herein may be used in numerous applications. For example, disclosed anomaly detectors may be used advantageously for analyzing data received from sensors. Examples of data types for which disclosed anomaly detectors may be used to analyze include, for example, digital images, video, radar, LiDAR, ultrasonic, motion, thermal images, audio, or sonar.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for generating an anomaly detector, comprising:
   - generating a plurality of training distributions, each training distribution representing a different task;
   - for each of the plurality of training distributions, normalizing a batch from the training distribution;
   - for each of the normalized batches, including in a neural network a normalization layer;
   - generating a loss function, wherein the loss function, when applied to training data, includes a first loss for each data point in the training data that is an anomaly and includes a second loss for each data point in the training data that is not an anomaly; and
   - training the neural network, wherein the training includes applying the generated loss function to the training data.

2. The method of claim 1, wherein the training data includes tabular data.

3. The method of claim 1, wherein the training data includes image data.

4. The method of claim 1, wherein each of the plurality of training distributions includes a fraction $(1-\pi)$ of data points that are anomalies, where $\frac{1}{2} \ll \pi \leq 1$.

5. The method of claim 1, wherein normalizing a batch includes shifting normal data in each training distribution so that each training distribution is centered around an origin.

6. The method of claim 1, wherein each of the plurality of training distributions includes a fraction $(1-\pi)$ of data points that are anomalies, where $\frac{1}{2} \ll \pi \leq 1$, and normalizing a batch includes shifting normal data in each training distribution so that each training distribution is centered around an origin.

7. The method of claim 1, wherein the trained neural network is configured to perform zero-shot anomaly detection.

8. The method of claim 1, wherein each of the plurality of training distributions includes a fraction $(1-\pi)$ of data points that are anomalies, where $\frac{1}{2} \ll \pi \leq 1$; wherein normalizing a batch includes shifting normal data in each training distribution so that each training distribution is centered around an origin; wherein the trained neural network is configured to perform zero-shot anomaly detection.

9. The method of claim 1, wherein normalizing a batch includes shifting normal data in each training distribution so that each training distribution is centered around an origin and the trained neural network is configured to perform zero-shot anomaly detection.

10. The method of claim 1, wherein each of the plurality of training distributions includes a fraction $(1-\pi)$ of data points that are anomalies, where $\frac{1}{2} \ll \pi \leq 1$; wherein normalizing a batch includes shifting normal data in each training distribution so that each training distribution is centered around an origin; wherein the trained neural network is configured to perform zero-shot anomaly detection.

11. The method of claim 1, wherein the training data includes tabular data and the trained neural network is configured to perform zero-shot anomaly detection.

12. The method of claim 1, wherein the training data includes image data and the trained neural network is configured to perform zero-shot anomaly detection.

13. The method of claim 1, wherein applying the generated loss function to the training data includes minimizing the loss function.

14. A non-transitory memory including processor-executable instructions that when executed cause the following operations to be performed: generating a plurality of training distributions, each training distribution representing a different task, wherein each of the plurality of training distributions includes a fraction (1) of data points that are anomalies, where; for each of the plurality of training distributions, normalizing a batch from the training distribution, wherein normalizing a batch includes shifting normal data in each training distribution so that each training distribution is centered around an origin; including in a neural network a plurality of normalization layers, wherein each of the normalization layers corresponds to one of the normalized batches; generating a loss function, wherein the loss function, when applied to training data, includes a first loss for each data point in the training data that is an anomaly and includes a second loss for each data point in the training data that is not an anomaly; and training the neural network, wherein the training includes applying the generated loss function to the training data, wherein the trained neural network is configured to perform zero-shot anomaly detection.

15. The non-transitory memory of claim 14, wherein the training data includes tabular data.

16. The non-transitory memory of claim 14, wherein the training data includes tabular data.

17. A system, comprising: one or more processors; and one or more non-transitory memories communicatively connected to the one or more processors, the one or more non-transitory memories including processor-executable instructions that when executed cause the following operations to be performed: generating a plurality of training distributions, each training distribution representing a different task, wherein each of the plurality of training distributions includes a fraction (1) of data points that are anomalies, where; for each of the plurality of training distributions, normalizing a batch from the training distribution, wherein normalizing a batch includes shifting normal data in each training distribution so that each training distribution is centered around an origin; including in a neural network a plurality of normalization layers, wherein each of the normalization layers corresponds to one of the normalized batches; generating a loss function, wherein the loss function, when applied to training data, includes a first loss for each data point in the training data that is an anomaly and includes a second loss for each data point in the training data that is not an anomaly; and training the neural network, wherein the training includes applying the generated loss function to the training data, wherein the trained neural network is configured to perform zero-shot anomaly detection.

18. The system of claim 17, wherein the training data includes tabular data.

19. The system of claim 17, wherein the training data includes image data.

20. The system of claim 17, wherein applying the generated loss function to the training data includes minimizing the loss function.

* * * * *